United States Patent
Kataoka et al.

(10) Patent No.: US 7,810,236 B2
(45) Date of Patent: Oct. 12, 2010

(54) METHOD FOR MANUFACTURING A POWER TRANSMITTING APPARATUS

(75) Inventors: Makoto Kataoka, Shizuoka (JP); Satoru Kashiwagi, Shizuoka (JP); Shunichi Itou, Shizuoka (JP)

(73) Assignee: Kabushiki Kaisha F.C.C. (JP)

( * ) Notice: Subject to any disclaimer, the term of this patent is extended or adjusted under 35 U.S.C. 154(b) by 1373 days.

(21) Appl. No.: 11/269,190

(22) Filed: Nov. 8, 2005

(65) Prior Publication Data
US 2006/0096077 A1 May 11, 2006

(30) Foreign Application Priority Data
Nov. 9, 2004 (JP) .............................. 2004-325289

(51) Int. Cl.
*B23P 17/00* (2006.01)
(52) U.S. Cl. ...................... 29/888; 29/527.5; 192/12 R; 192/12 A; 192/93 R; 192/54.5
(58) Field of Classification Search ................ 29/527.5, 29/888; 164/365; 192/93 R, 87.12, 54.5, 192/12 R, 12 A
See application file for complete search history.

(56) References Cited
U.S. PATENT DOCUMENTS
1,505,538 A * 8/1924 Bull ........................... 164/365
2,351,996 A * 6/1944 Morgan ...................... 192/54.5

FOREIGN PATENT DOCUMENTS
EP         1 058 018 A2    12/2000

* cited by examiner

*Primary Examiner*—Rick K Chang
(74) *Attorney, Agent, or Firm*—Harness, Dickey & Pierce, P.L.C.

(57) ABSTRACT

A method for manufacturing a power transmitting apparatus by molding both the pressure-contact assist cam and back-torque limiting cam even though either one of the pressure-contact assist cam and back-torque limiting cam is molded as a reverse-draft surface. The power transmitting apparatus has a clutch housing (2) and a clutch member (4) connected to an output member (3). A plurality of driven clutch plates (7) alternately is arranged between the driving clutch plates (6) of the clutch housing. The pressure plate (5) and the clutch member (4) are, respectively, formed with through windows (5c) and (4c) at positions corresponding to the pressure-contact assist cams (4aa) and (5ba) and the back-torque limiting cams (4ab) and (5bb) to form reverse-draft surfaces of the pressure-contact assist cams (4aa) and (5ba) and the back-torque limiting cams (4ab) and (5bb) by inserting pin-shaped cores into the windows (5c) and (4c).

4 Claims, 4 Drawing Sheets

_US 7,810,236 B2_

METHOD FOR MANUFACTURING A POWER TRANSMITTING APPARATUS

CROSS-REFERENCE TO RELATED APPLICATION

This application claims priority to Japanese Patent Application No. 2004-325289, filed Nov. 9, 2004, which application is herein expressly incorporated by reference.

FIELD OF THE INVENTION

The present invention relates to a power transmitting apparatus for arbitrarily transmitting or cutting-off a rotational force of an input member to or from an output member.

BACKGROUND OF THE INVENTION

In general, vehicle power transmission apparatus generally uses so-called multiple disk clutches to arbitrarily transmit or cut off power of an engine to or from the vehicle wheels. In such a power transmitting apparatus, it has an input member connected to an engine side, an output member connected to a driven side, and a clutch member connected to the output member. The power can be transmitted by pressure-contacting a plurality of driving clutch plates mounted on the input member and a plurality of driven clutch plates mounted on the clutch member. The power can be cut off by releasing the pressure-contacting force between the driving and driven clutch plates.

The prior art (e.g. European Laid-open Patent Specification No. 1058018) discloses technology which provides cams to add a pressure-contact assist function to improve the pressure-contacting force of both the driving and driven clutch plates during power transmission. Also, they provide a back-torque limiting function to release the clutch plates of the input and output sides when the rotation speed of the output member has exceeded that of the input member. According to this power transmitting apparatus, two cams are formed with gradients on each engaging surface of a clutch housing and a driving clutch plate. Thus, both the driving and driven clutch plates are strongly pressure-contacted by one pair of cams (pressure-contact assist cams) during the normal power transmission. On the contrary, the driving clutch plates are moved by the other pair of cams (back-torque limiting cams) toward a direction where the pressure-contact between the driving and driven clutch plates is released when back-torque is present.

However in the power transmitting apparatus of the prior art, since the pressure contact assist cams and back-torque limiting cams are formed on engaging surfaces between a clutch housing and driving clutch plates, with a gradient angle, the strength of the cams is sometimes insufficient.

Accordingly, to overcome this disadvantage, the applicant of the present invention provides the pressure contact assist cams and back-torque limiting cams on recesses of the clutch member and stopper portions on the pressure plate. All are made of high strength material to be used to prevent relative rotation between the clutch member and the pressure plate.

The stopper portions project from and are formed integrally with the pressure plate. The stopper portions are adapted to fit into recesses formed on the inner circumferential surface of the clutch member. This fit prevents relative rotation between the pressure plate and the clutch member. Thus, both the clutch member and the pressure plate are made of material having high strength. Therefore, the integrally formed pressure contact assist cams and back-torque limiting cams also have high strength to perform a function as a cam. In general, since the clutch member and the pressure plate are formed by casting, two cams, the pressure contact assist cam and back-torque limiting cam are formed in accordance with a profiled surface of preformed dies.

However, in the power transmitting apparatus mentioned above, since the gradient surfaces are formed on the stopper portion of the pressure plate and the recess of the clutch member which are formed by casting, a problem exists that either one of the pressure contact assist cams and/or back-torque limiting cam becomes a reverse draft surface. Thus, casting of them becomes difficult.

Ordinarily, casting is carried out by pouring molten metal into a cavity which is formed between movable dies and stationary dies with profiled surfaces corresponding to a configuration of an article to be cast. However, either one of the pressure contact assist cam and back-torque limiting cam is molded to a configuration (such a configuration is called as a "reverse-draft surface") which inevitably interferes with the profiled surface of the movable die when separating the movable die from the stationary die after molding. This makes the molding of the pressure-contact assist cam and back-torque limiting cam difficult.

SUMMARY OF THE INVENTION

It is, therefore, an object of the present invention to provide a method for manufacturing a power transmitting apparatus which can mold both the pressure-contact assist cam and back-torque limiting cam even though either one of the pressure-contact assist cam and back-torque limiting cam is molded as a reverse-draft surface.

In accordance with the present invention, a method of manufacturing a power transmitting apparatus comprises providing a clutch housing with a plurality of driving clutch plates rotatable together with an input member. A clutch member, connected to an output member, has a plurality of driven clutch plates alternately arranged between the driving clutch plates of the clutch housing. A pressure plate is mounted on the clutch member and is movable in an axial direction of the clutch member. The pressure plate carries out the pressure-contact or release of the driving clutch plates and the driven clutch plates, via the axial movement relative to the clutch member. Stopper portions project from the pressure plate and are fitted in recesses formed on the inner circumferential surface of the clutch member to limit the rotation of pressure plate relative to the clutch member. Pressure-contact assists cams increase the pressure-contacting force between the driving clutch plates and driven clutch plates when transmission of the rotational force inputted to the input member to the output member is achieved. Back-torque limiting cams release the connection between the driving clutch plates and the driven clutch plates when the rotation speed of the output member exceeds that of the input member. Both the pressure-contact assist cams and the back-torque limiting cams are formed on the recesses of the clutch member and on the stopper portions of the pressure plate. The pressure plate includes the stopper portions and the clutch member includes the recesses. The pressure plate and the clutch member are, respectively, formed with through windows at positions corresponding to the pressure-contact assist cams and the back-torque limiting cams and by inserting pin-shaped cores into the windows form reverse-draft surfaces of the pressure-contact assist cams and the back-torque limiting cams.

According to the present invention, since the pressure plate and the clutch member are respectively formed with through windows at positions corresponding to the pressure-contact assist cams and the back-torque limiting cams and by inserting pin-shaped cores into the windows form reverse-draft surfaces of the pressure-contact assist cams and the back-torque limiting cams, it is possible to mold both the pressure-contact assist cam and back-torque limiting cam even though either one of the pressure-contact assist cam and back-torque limiting cam is molded as a reverse-draft surface.

Although the clutch member and the pressure plate are formed with through windows, the windows do not give any influence to functions of the clutch member and the pressure plate. The windows contribute to weight reduction of the power transmitting apparatus and to the cooling effect of the power transmitting apparatus. Cooling is introduced by ambient air passing through the windows during use of the power transmitting apparatus.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

A preferred embodiment of the present invention will be hereinafter described with reference to accompanied drawings.

Figure 1:
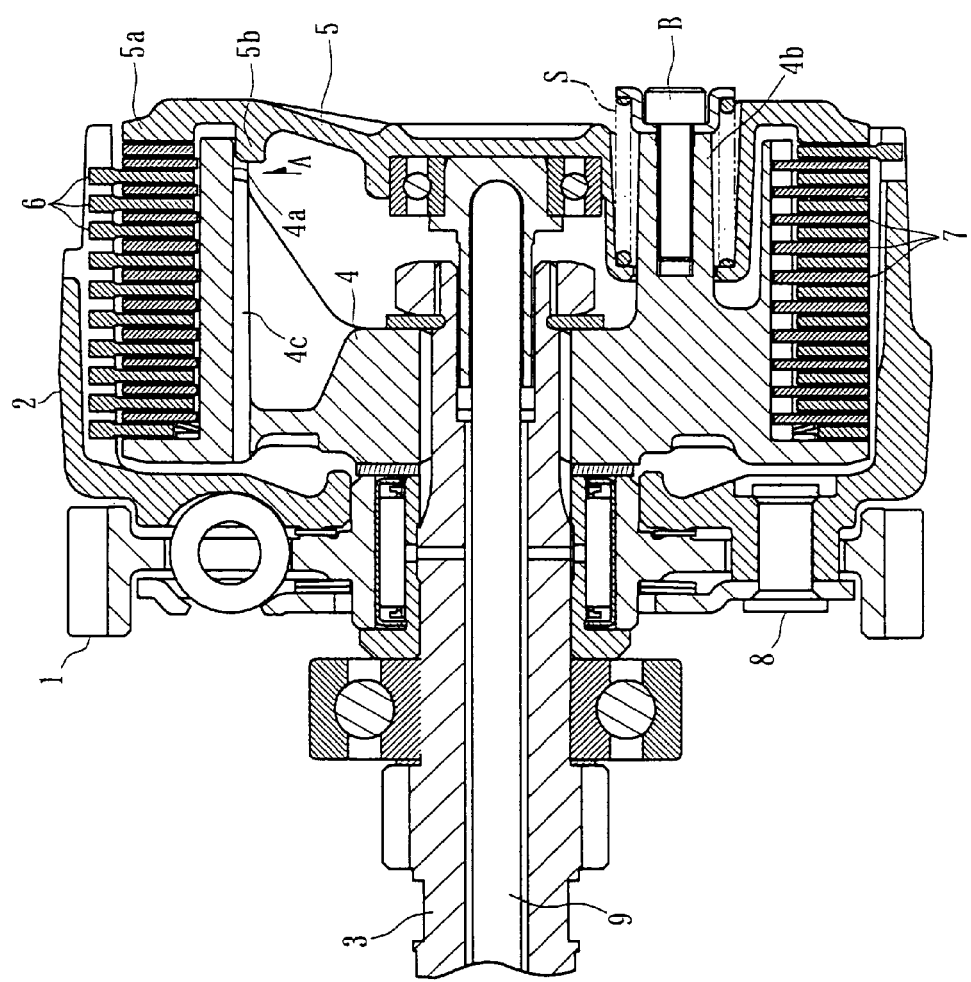
FIG. 1 is a longitudinal section view of a power transmitting apparatus of the present invention.

A power transmitting apparatus of a first embodiment of the present invention is mounted on a vehicle or motorcycle to arbitrarily transmit or cut-off the driving force of an engine and transmission to or from the rear wheels. As shown in FIG. 1, the power transmitting apparatus of the present invention includes a clutch housing 2 with a gear 1 as an input member. A clutch member 4, connected to a shaft 3, acts as an output member. A pressure plate 5 is mounted on the clutch member 4 at the right end (in view of FIG. 1). Driving clutch plates 6 are connected to the clutch housing 2. Driven clutch plates 7 are connected to the clutch member 4.

The gear 1 is rotated around the shaft 3 by a driving force (rotational force) transmitted from the engine. The gear 1 is connected to the clutch housing 2 via rivets 8 etc. The clutch housing 2 is a cylindrical casing member opened at its right end. The clutch housing 2 includes a plurality of driving clutch plates 6 on its inner circumferential surface. Each of the driving clutch plates 6 is formed as a substantially annular plate member and is rotated together with the clutch housing 2.

The clutch 4 is formed as a cylindrical casing member opened at its right end. The clutch 4 is adapted to be received within the clutch housing 2. The shaft 3 passes through the center of the clutch member 4 and is connected via a spline connection. Thus, the shaft 3 is rotated by the clutch member 4. Axially extending splines are formed on the outer circumferential surface of the clutch member 4. The driven clutch plates 7 are fitted onto the splines.

The driven clutch plates 7 are alternately arranged with the driving clutch plates 6. Thus, clutch plates 6 and 7 are adjacent each other and can be pressure-contacted or released. Accordingly, both clutch plates 6 and 7 are allowed to be slid axially of the clutch member 4. The clutch plates 6 and 7 pressure-contact each other when they are pushed by the pressure plate 5 toward a left direction (in view of FIG. 1). Thus, the rotational force can be transmitted to the clutch member 4 and the shaft 3. When the pressure plate 5 is released, the clutch plates 6 and 7 release each other and the clutch member 4 cannot follow the rotation of the clutch housing 2. Accordingly, the clutch member 4 is stopped so that power cannot be transmitted to the shaft 3.

In this case, it should be noted that "release" of the clutch plates 6 and 7 means a condition where the pressure-contact is lost. Thus, the clutch member 4 does not follow the rotation of the clutch housing 2 (a condition where the driving clutch plates 6 slide on the driven clutch plates 7) and thus it is out of the question whether there is any clearance between the clutch plates 6 and 7.

The pressure plate 5 has an overall disc configuration, such as closing the opening (the right end) of the clutch member 4, and is normally urged toward a left direction by the clutch spring S. The urging of the pressure plate 5 is achieved by the clutch spring S arranged between a boss portion 4b, projecting from the clutch member 4 and extending through the pressure plate 5, and a head of a clutch bolt B, screwed into the boss portion 4b.

Thus, the circumferential edge portion 5a of the pressure plate 5 abuts the clutch plate 7 positioned at right most position. The clutch plates 6 and 7 are normally pressure-contacted toward each other by the clutch spring S. Accordingly, the clutch housing 2 and the clutch member 4 are kept in a normally connected condition. Thus, the gear 1 can rotate the shaft 3 when the rotational force is inputted to the gear 1.

A push rod 9 is arranged inside of the shaft 3. The pressure-contact force between the driving and driven clutch plates 6 and 7 can be released when a driver of the vehicle operates or moves the push rod 9 toward a right direction (in view of FIG. 1). This moves the pressure plate 5 toward a right direction against the urging force of the clutch spring S. When the pressure-contacting force between the driving and driven clutch plates 6 and 7 is released, the rotational force inputted to the gear 1 and the clutch housing 2 is cut-off. Thus, rotational force is not transmitted to the shaft 3. Accordingly, the pressure-contact or the release between the plates 6 and 7 can be achieved by the axial movement of the push rod 9 and the pressure plate 5.

The pressure plate 5 is formed with several projecting stopper portions 5b to limit rotation of the pressure plate 5 relative to the clutch member 4. Each stopper portion 5b has a projected configuration and is fit in a recess 4a formed on the inner circumferential surface of the clutch member 4 to limit the relative rotation between the pressure plate 5 and the clutch member 4.

Figure 2:
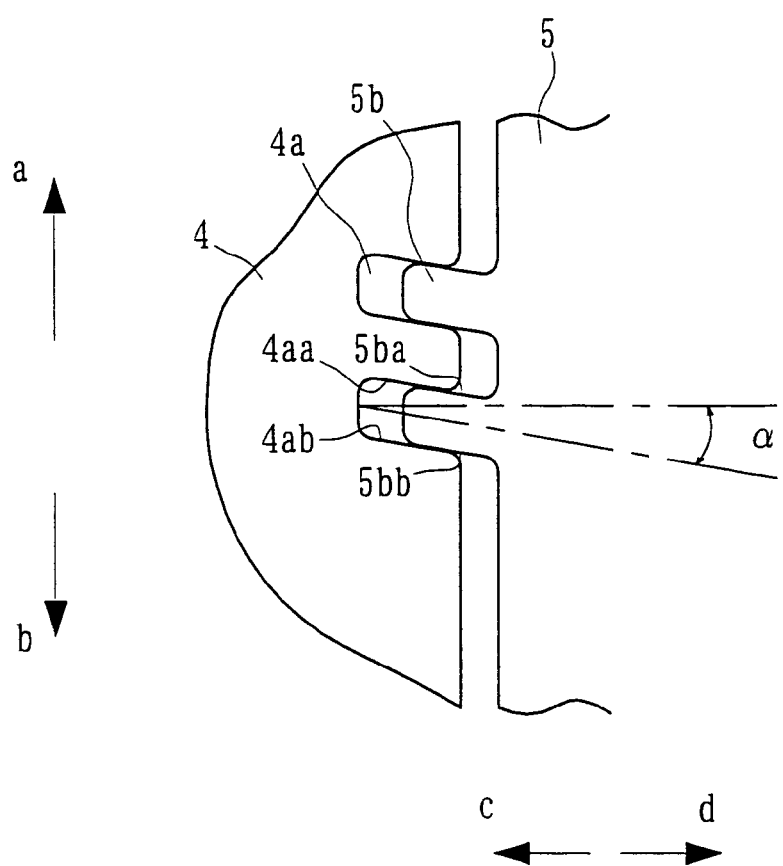
FIG. 2 is a schematic view of a region near the stopper portions and recesses taken in a direction of arrow A in FIG. 1.

Referring to FIG. 2, the stopper portions 5b of the pressure plate 5 are formed with cam surfaces 5ba and 5bb, each having a gradient angle α. On the other hand, the recesses 4a of the clutch member 4, into which the stopper portions 5b are fit, are formed with cam surfaces 4aa and 4ab, which correspond to the cam surfaces 5ba and 5bb, respectively. That is, each pair of mutually contacting cam surfaces 5ba and 4aa forms the pressure-contact assist cam and other pair of mutually contacting cam surfaces 5bb and 4ab forms the back-torque limiting cam.

When the rotational force input to the gear 1 and the clutch housing 2 is transmitted to the shaft 3, via the clutch member 4, the rotational force, in a direction shown by arrow "b" in FIG. 2, is applied to the clutch member 4. Accordingly, the pressure plate 5 is moved toward a direction shown by arrow "c" by the camming action of pressure-contact assist cams. Thus, the pressure-contact force is increased between the driving and driven clutch plates 6 and 7.

On the other hand, when back-torque exists, in a direction shown by arrow "a", the rotational speed of the shaft 3 exceeds that of the gear 1 and the clutch housing 2. Thus, the pressure plate 5 is moved in a direction shown by arrow "d". Thus, the driving and driven clutch plates 6 and 7 are released. Accordingly, trouble caused by back-torque in the power transmitting apparatus or power unit (an engine) can be avoided.

According to the present invention, since the pressure-contact assist cams and the back-torque limiting cams are arranged, respectively, at the recesses 4a on the inner circumferential wall of the clutch member 4 and the stopper portions 5b, it is possible to suppress an increase in the manufacturing cost as compared with a case of additionally providing the pressure-contact assist cams and the back-torque limiting cams at any other portions of the power transmitting apparatus. That is, since the clutch member 4 and the pressure plate 5 are formed by casting, two cams, pressure-contact assist cams and back-torque limiting cams, can be formed in accordance with preformed profiled surfaces of the dies. Thus, an increase in the number of parts can be avoided.

According to the power transmitting apparatus of the present invention, it is possible to obtain the pressure-contact assist function and the back-torque limiting function by changing only the configuration of the stopper portions and the recess, which receives the stopper portions, of the prior art. Furthermore, since the stopper portions of the prior art also exhibit a function to prevent rotation of the pressure plate 5 and since the stopper portions are made to have a relatively high rigidity, no other process to increase the rigidity is required. Accordingly, the present invention can be easily applied to the power transmitting apparatus of the prior art.

Figure 3:
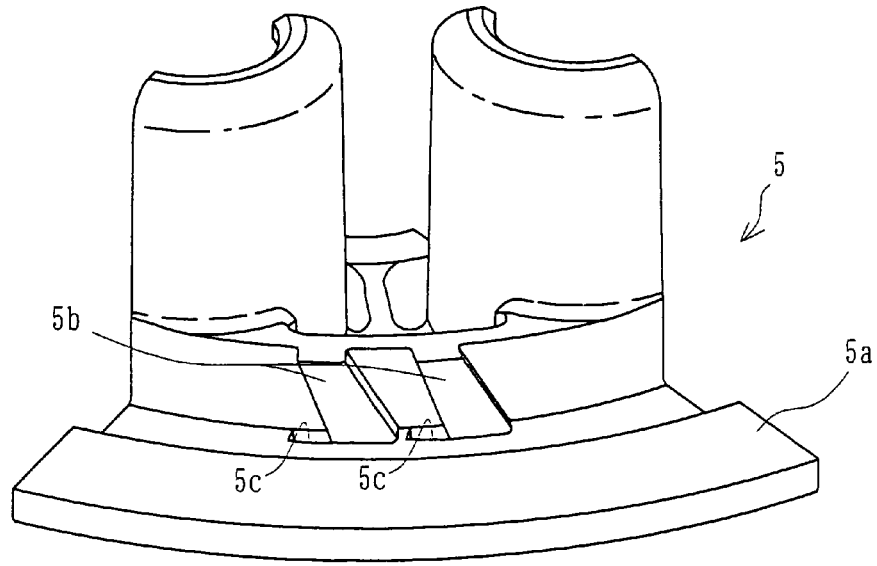
FIG. 3 is a partially enlarged perspective view of a pressure plate showing a method for manufacturing a power transmitting apparatus of the present invention.

In the power transmitting apparatus, through windows 5c (see FIG. 3) and windows 4c (see FIG. 1) are formed in the pressure plate 5 and the clutch member 4 at positions near the pressure-contact assist cams and the back-torque limiting cams, respectively. In these windows, the windows 5c are formed as passing through portions corresponding to the pressure-contact assist cams or the back-torque limiting cams. The windows are positioned at sides to form the reverse-draft surfaces when the pressure plate 5 is cast as shown in FIG. 3.

Figure 4:
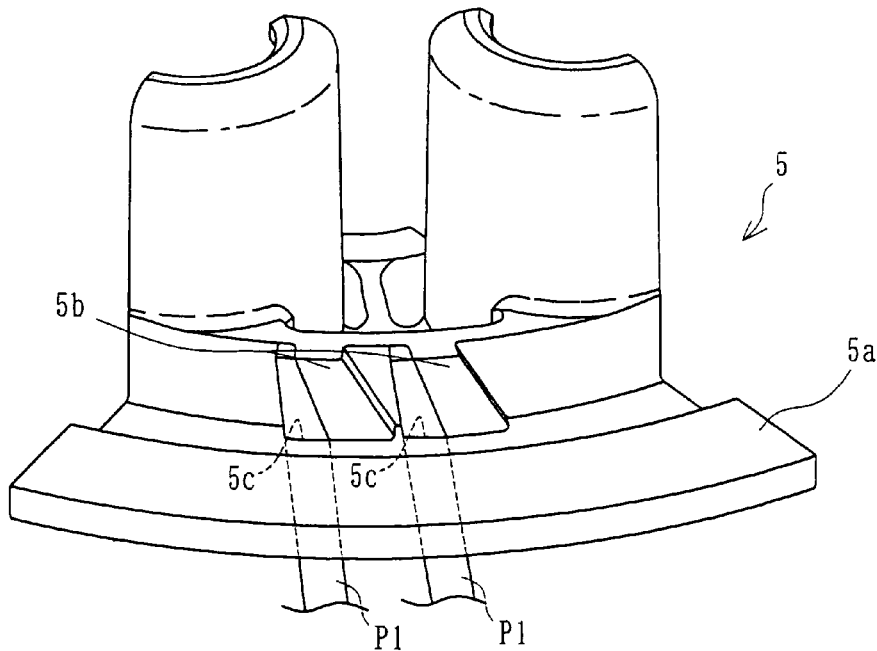
FIG. 4 is a partially enlarged perspective view of a pressure plate into which pin-shaped cores are inserted showing a method for manufacturing a power transmitting apparatus of the present invention.

As shown in FIG. 4, when the pressure plate 5 is made by casting, pin-shaped cores P1 are inserted through the windows 5c, more particularly, at positions where the windows 5c are formed, in order to form cams with reverse-draft surfaces in either one of the pressure-contact assist cams or the back-torque limiting cams. The description as to casting is made for convenience. Thus, the windows 5c can be formed together with the reverse-draft surfaces, in actual, by pouring molten metal into a cavity of a casting mold at positions where the windows 5c are to be formed after arranging the pin-shaped cores P1. The pin-shaped cores P1 are kept in their inserted condition through the windows 5c after the pressure plate 5 has been formed, prior to its release from the mold. This is true in case of a description of forming of the windows 4c hereinafter mentioned.

Figure 5:
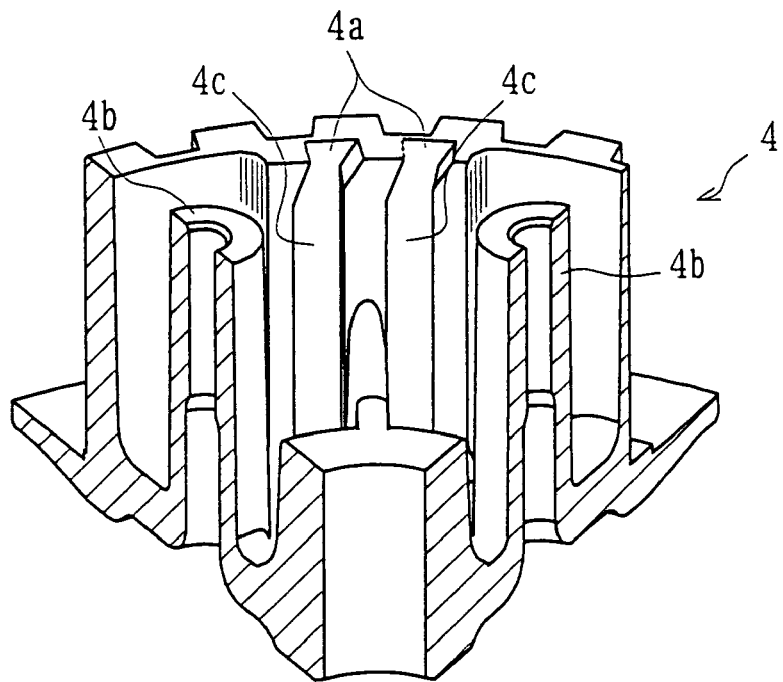
FIG. 5 is a partially enlarged perspective view of a clutch member showing a method for manufacturing a power transmitting apparatus of the present invention.
Figure 6:
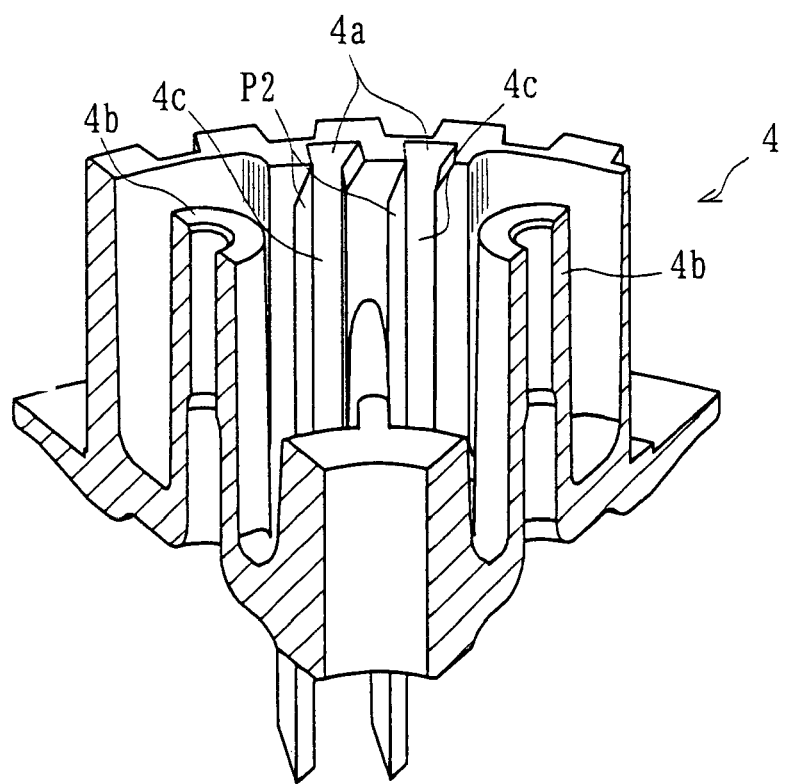
FIG. 6 is a partially enlarged perspective view of a clutch member into which pin-shaped cores are inserted showing a method for manufacturing a power transmitting apparatus of the present invention.

As shown in FIGS. 1 and 5, the windows 4c are formed as pass through portions corresponding to the pressure-contact assist cams or the back-torque limiting cams. The windows 4c are arranged so that pin-shaped cores P2 can be inserted therethrough at sides to form the reverse-draft surfaces when the clutch member 4 is cast as shown in FIG. 6. When the clutch member 4 is made by casting, pin-shaped cores P2 are inserted through the windows 4c, more particularly, at positions where the windows 4c are formed, in order to form cams with reverse-draft surfaces in either one of the pressure-contact assist cams or the back-torque limiting cams, as shown in FIG. 6.

Accordingly the present invention enables satisfactory casting of the clutch member 4 and the pressure plate 5 of the power transmitting apparatus even though they have reverse-draft surfaces. Although the clutch member 4 and the pressure plate 5 are formed with through windows 4c and 5c, the windows 4c and 5c do not provide any influence on functions of the clutch member 4 and the pressure plate 5. The windows 4c and 5c contribute to weight reduction of the power transmitting apparatus and to the cooling effect of the power transmitting apparatus. Cooling introduces ambient air through the windows 4c and 5c during use of the power transmitting apparatus.

Although the present invention has been described with reference to the preferred embodiment, the present invention is not limited to the illustrated explanations. For example the present invention can be applied to an arrangement where the pressure-contact assist cams and the back-torque limiting cams have cam surfaces with different gradient angles. The power transmitting apparatus of the present invention can be applied to a power transmitting apparatus of a multiple disc clutch type used for three or four wheeled buggies, machines for multiple use other than for a motorcycle.

The method of manufacturing a power transmitting apparatus of the present invention can be applied to a method for manufacturing a power transmitting apparatus with different outline configurations or additional functions if they are apparatus where the windows are formed by pass through portions. The portions correspond to the pressure-contact assist cams or the back-torque limiting cams and the reverse-draft surfaces are formed by inserting the pin-shaped cores through the windows and then by casting.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A method of manufacturing a power transmitting apparatus comprising:
providing a clutch housing having a plurality of driving clutch plates rotatable together with an input member;

connecting a clutch member connected to an output member, said clutch member having a plurality of driven clutch plates alternately arranged between the driving clutch plates of the clutch housing;

mounting a pressure plate mounted on the clutch member, said pressure plate movable in an axial direction of the clutch member for carrying out pressure-contact or release of the driving clutch plates and the driven clutch plates via axial movement relative to the clutch member;

fitting stopper portions in recesses formed on an inner circumferential surface of the clutch member, said stopper portions integrally projecting from the pressure plate;

limiting rotation of the pressure plate relative to the clutch member;

increasing the pressure-contacting force between the driving clutch plates and driven clutch plates by pressure-contact assist cams when transmission of the rotational force inputted to the input member to the output member is achieved; and releasing the connection between the driving clutch plates and the driven clutch plates by back-torque limiting cams when the rotation speed of the output member exceeds that of the input member, both the pressure-contact assist cams and the back-torque limiting cams being formed on the recesses of the clutch member and on the stopper portions of the pressure plate; and casting forming the pressure plate including the stopper portions and the clutch member including the recesses, the pressure plate and the clutch member include through windows at positions corresponding to the pressure-contact assist cams and the back-torque limiting cams by inserting pin-shaped cores into the windows to form reverse-draft surfaces of the pressure-contact assist cams and the back-torque limiting cams.

2. The method for manufacturing a power transmitting apparatus of claim 1, further comprising forming the pressure-contact assist cams and the back-torque limiting cams as well as the pressure plate and the clutch member together with the reverse-draft surfaces by pouring molten metal into a cavity of a casting mold at positions where the windows are to be formed after the pin-shaped cores P1 having been arranged.

3. The method for manufacturing a power transmitting apparatus of claim 1, further comprising forming the pressure-contact assist cams with cam surfaces having a predetermined gradient on the stopper portion of the pressure plate and forming the back-torque limiting cams with cam surfaces having a predetermined gradient on the recess of the clutch member.

4. A method for manufacturing a power transmitting apparatus of claim 3, further comprising providing the pressure-contact assist cams and the back-torque limiting cams with cam surfaces having different gradient angles.

* * * * *